(12) United States Patent
Sausner et al.

(10) Patent No.: US 6,412,521 B1
(45) Date of Patent: Jul. 2, 2002

(54) RIGID LINE FOR A BRAKE, FUEL OR HYDRAULIC SYSTEM IN MOTOR VEHICLES

(75) Inventors: Andreas Sausner, Frankfurt; Martin Henkenjohann, Bielefeld, both of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/672,407

(22) Filed: Sep. 28, 2000

(30) Foreign Application Priority Data

Sep. 28, 1999 (DE) .......................... 199 46 544

(51) Int. Cl.[7] .................................................. F16L 9/14
(52) U.S. Cl. ...................... 138/143; 138/139; 138/137; 138/DIG. 2; 138/141
(58) Field of Search ................. 138/143, 145, 138/137, 140, 141, DIG. 2, 139, 172, 174

(56) References Cited

U.S. PATENT DOCUMENTS

| 2,991,808 A | | 7/1961 | Siegmann et al. | .......... 138/141 |
|---|---|---|---|---|
| 4,131,710 A | * | 12/1978 | VanAuken | .................. 138/143 |
| 4,173,670 A | * | 11/1979 | VanAuken | .............. 138/143 X |
| 4,216,802 A | | 8/1980 | Bonnes et al. | .............. 138/143 |
| 4,269,234 A | * | 5/1981 | Johnson et al. | ......... 138/143 X |
| 4,351,364 A | * | 9/1982 | Cocks | .................... 138/143 X |
| 5,380,131 A | * | 1/1995 | Crawford | ..................... 138/98 |
| 6,174,569 B1 | * | 1/2001 | Blomer et al. | .............. 138/146 |

FOREIGN PATENT DOCUMENTS

EP 0 768 488 A2 4/1997

* cited by examiner

*Primary Examiner*—Patrick Brinson
(74) *Attorney, Agent, or Firm*—Young & Basile, P.C.

(57) ABSTRACT

Processes and arrangements provide a rigid line for a brake, fuel or hydraulic system in motor vehicles, whose synthetic cladding layer is reinforced with fibers to thereby increase the strength and the resistance to wear and tear of the synthetic cladding layer. Moreover, by the use of electrically conductive carbon fibers, electrostatic charging of the rigid line can also be prevented.

14 Claims, 1 Drawing Sheet

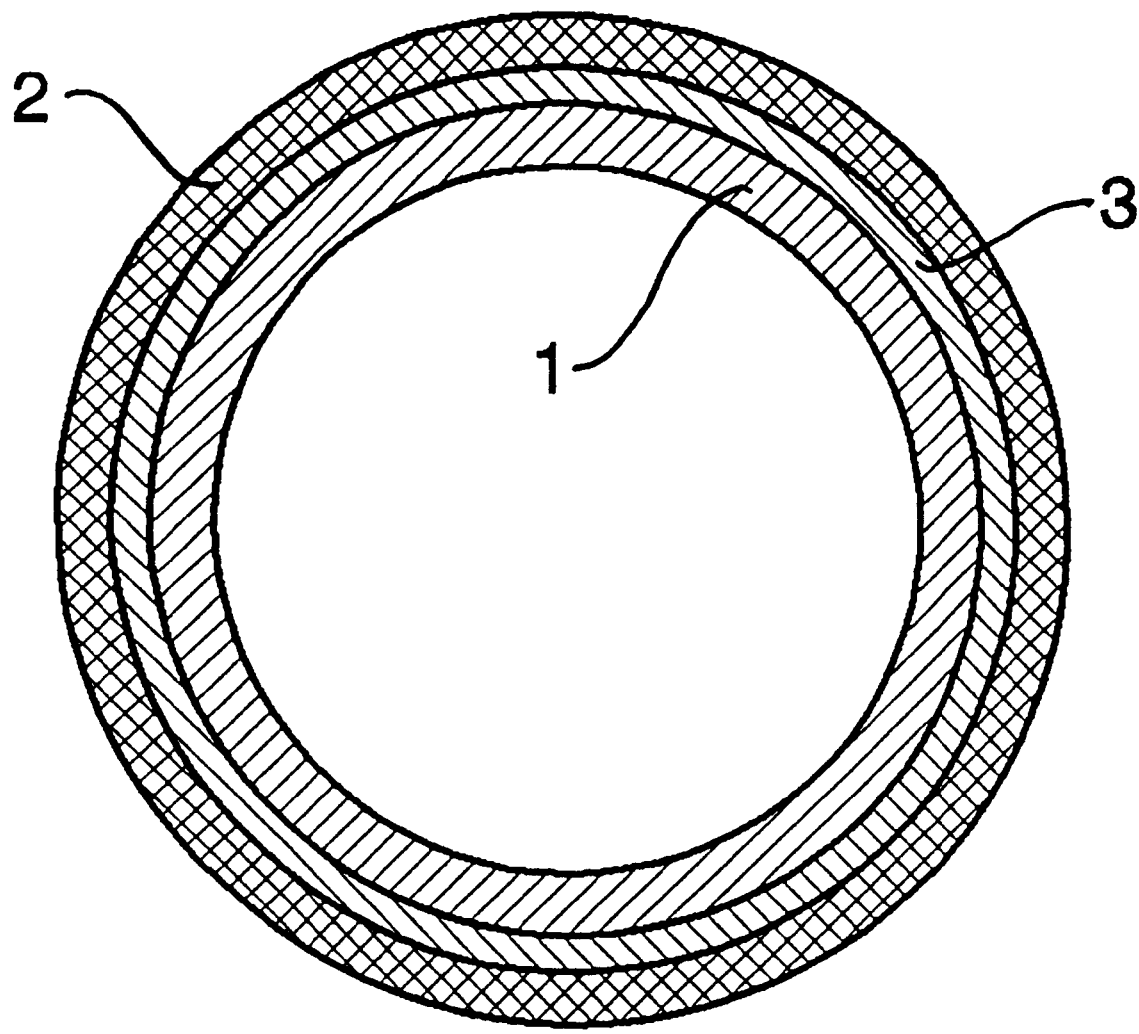

RIGID LINE FOR A BRAKE, FUEL OR HYDRAULIC SYSTEM IN MOTOR VEHICLES

BACKGROUND

The invention relates to a rigid line for a brake, fuel or hydraulic system in motor vehicles, with an interior pipe which is surrounded by a layer of synthetic cladding.

Great demands are made on the rigid lines of brake, fuel or hydraulic systems in motor vehicles. They must be resistant to brake fluid, fuel or hydraulic fluid and to environmental influences to which they are exposed. Furthermore, it must be possible to subject them to high pressures and they must be corrosion-resistant over a time span of more than 10 years.

In order to meet these demands, rigid lines provided with several layers are used. Rigid lines are known that have an interior pipe of aluminum or steel which, for reasons of corrosion protection, is coated with a thermoplastic material. Furthermore, rigid lines are known whose interior pipe consists of a synthetic material which is coated on its exterior with a thermoplastic synthetic material.

SUMMARY OF THE INVENTION

It is the task of the invention to provide rigid lines for a brake, fuel or hydraulic system in motor vehicles, which are surrounded by a synthetic cladding providing increased resistance to corrosion, wherein the abrasion behavior of the synthetic cladding is improved and the mechanical strength of the rigid lines is further increased.

In accordance with the invention, this task is achieved by a rigid line for a brake, fuel or hydraulic system in motor vehicles, with an interior pipe which is surrounded by a synthetic cladding layer, wherein fibers are contained in the synthetic cladding layer.

These fibers have very high tensile strength so that the penetration of pointed objects, for example, stone chips which are flung up by the wheels of the motor vehicle when the vehicle is in motion is made more difficult. As a result, the danger of the synthetic cladding layer being damaged, thereby subjecting the interior pipe to an unimpeded corrosion attack, is reduced. Also, the fibers improve the abrasion behavior of the synthetic cladding layer and, moreover, particularly when the interior pipe is made of a synthetic material, are able to increase the strength of the rigid line.

As a supplement to the invention, it is provided that the synthetic cladding layer consist of polyethylene, so that the synthetic cladding layer can absorb the energy of impacting stones or the like to a high degree, whereby the penetration of the metallic surface by the stones is prevented.

With this variant of the invention, it is provided that an intermediate layer be present between the interior pipe and the synthetic cladding layer so that the adhesion of the synthetic cladding layer to the interior pipe is improved.

In the case of other embodiments of the invention, the interior pipe consists of a metallic material, particularly aluminum, so that a high resistance to pressure of the rigid line is achieved and, furthermore, the rigid line can be bent easily and can be worked in other ways.

As a supplement to the invention, it is provided that an olive-chromating be used as an intermediate layer so that a particularly good adhesion of the synthetic cladding layer to an interior pipe made of steel is achieved. Furthermore, the olive-chromating acts as an additional corrosion protection layer, so that the resistance to corrosion of the rigid line is further improved.

In another embodiment of the invention, a primer is used as an intermediate layer, so that a good adhesiveness between the interior pipe and the layer of synthetic cladding is achieved.

As a supplement to the invention, it is provided that the interior pipe consist of an electrically conductive synthetic material, so that no corrosion problems occur and, on the other hand, an electrostatic charging of the interior pipe can be safely prevented by grounding. The use of an electrically conductive synthetic cladding layer also makes possible the. grounding of the rigid line of the invention when the latter is connected via electrically conductive connectors with other rigid lines or other components of the brake, fuel or hydraulic system.

In another variant of the invention, a gas-tight synthetic material is used as an intermediate layer, so that liquid in the interior pipe cannot escape in the form of gas and, in this way, no emissions can be released.

As a supplement to the invention, it is provided that the fibers consist of glass, so that the strength of the synthetic cladding layer and its resistance to abrasion is clearly increased. Also, glass fibers are a relatively cost-efficient fiber material.

In another embodiment of the invention, the fibers are electrically conductive, so that the exterior surface of the rigid line can also be grounded and, in this way, static charging of the rigid line can be eliminated. This is of particular significance when combustible liquids are moved through the rigid line or may be present in the immediate vicinity of the rigid line. For the prevention of electrostatic charging by grounding the rigid line, it is sufficient when the resistance of the synthetic cladding layer amounts to one $M\Omega/m$.

In another embodiment of the invention, the fibers consist of carbon, so that an additional increase of the strength of the synthetic cladding layer is achieved and the synthetic cladding layer becomes electrically conductive.

The initially mentioned task is also solved by means of a process for the manufacture of a rigid line wherein the synthetic cladding layer is applied to the interior pipe by the extrusion of a synthetic material mixed with fibers.

The admixture of fibers to the initial material of the synthetic cladding layer increases the resistance to penetrating pointed objects and to the strength of the rigid line. Furthermore, the abrasion behavior is improved. Additionally, by means of extruding the synthetic cladding layer, a close bond between the interior pipe and the synthetic cladding layer can be achieved. This close bond can be further improved when the interior pipe is heated prior to extrusion.

As an additional advantage of the process of the invention, it must be mentioned that the process requires no additional investments in the production arrangements, since only the material of the synthetic cladding layer must be changed.

BRIEF DESCRIPTION OF THE DRAWING

Further advantages and advantageous embodiments of the invention can be gathered from the subsequent description, the drawing and the claims.

One example of the object of the invention is shown in the drawing and is described in greater detail in the following text.

DETAILED DESCRIPTION

In the drawing, a rigid line of the invention is shown in cross section. The interior diameter of the rigid line is limited by the interior pipe 1. This interior pipe 1 may consist of aluminum, steel or a synthetic material. The interior pipe 1 is protected against environmental influences by a synthetic cladding layer 2. This synthetic cladding layer 2 is mixed with fibers and may be applied to the interior pipe 1, for example, by means of extrusion.

In order to achieve as close a bond as possible between the synthetic cladding layer 2 and the interior pipe 1, an intermediate layer 3 is present between the synthetic cladding layer 2 and the interior pipe 1. This intermediate layer 3 has the task of enhancing the adhesion and, moreover, can also act as an additional corrosion protection layer When the interior pipe 1 consists of steel, the intermediate layer 3 may consist of an olive-chromating which, due to its sawtooth-like surface structure, visible under a microscope, establishes a particularly good bond between the synthetic cladding layer 2 and the interior pipe 1.

The intermediate layer 3 may also be a primer which takes on mainly the task of facilitating an improved adhesion. In the case where the interior pipe 1 consists of a synthetic material, the intermediate layer 3 may also consist of a gas-tight synthetic material which prevents the evaporation of liquid from inside the interior pipe 1 into the environment. Naturally, it is also conceivable to omit the intermediate layer 3 and to apply the synthetic cladding layer 2 directly to the interior pipe 1.

The wall thicknesses of the interior pipe 1, as well as the thickness of the synthetic cladding layer 2 and the intermediate layer 3 are not shown to scale. For reasons of greater clarity, the synthetic cladding layer 2 and the intermediate layer 3 are shown thicker than they actually are.

All characteristics indicated in the description, the subsequent claims and the drawing may be essential to the invention either individually or also in any desired combination with each other.

What is claimed is:

1. A rigid line for a brake, fuel or hydraulic system in motor vehicles, the line comprising:

an interior pipe;

a thermoplastic synthetic cladding layer surrounding the interior pipe; and fibers contained in the synthetic cladding layer.

2. A rigid line in accordance with claim 1, wherein the thermoplastic synthetic cladding layer consists of polyethylene.

3. A rigid line in accordance with claim 1, wherein an intermediate layer is present between the interior pipe and the synthetic cladding layer.

4. A rigid line in accordance with claim 1, wherein the interior pipe consists of a metallic material.

5. A rigid line in accordance with claim 4, wherein the interior pipe is formed of aluminum.

6. A rigid line in accordance with claim 4, wherein the interior pipe is formed of steel.

7. A rigid line in accordance with claim 6, wherein an olive-chromating is used as an intermediate layer.

8. A rigid line in accordance with claim 6, wherein a primer is used as an intermediate layer.

9. A rigid line in accordance with claim 1, wherein the interior pipe consists of an electrically conductive synthetic material.

10. A rigid line in accordance with claim 9, wherein a gas-tight synthetic material is used as an intermediate layer, thereby substantially preventing hydrocarbon emissions from the rigid line.

11. A rigid line in accordance with claim 1, wherein the fibers are formed of glass.

12. A rigid line in accordance with claim 1, wherein the fibers are electrically conductive.

13. A rigid line in accordance with claim 12, wherein the fibers are formed of carbon.

14. A process for the manufacture of a rigid line in accordance with claim 1, wherein the synthetic cladding layer is applied to the interior pipe by extruding a synthetic material combined with fibers.

* * * * *